United States Patent [19]
Beckwith

[11] Patent Number: 5,541,498
[45] Date of Patent: Jul. 30, 1996

[54] DISTRIBUTION CIRCUIT VAR MANAGEMENT SYSTEM USING ADAPTIVE CAPACITOR CONTROLS

[76] Inventor: Robert W. Beckwith, 2794 Camden Rd., Clearwater, Fla. 34619

[21] Appl. No.: 353,492

[22] Filed: Dec. 8, 1994

[51] Int. Cl.[6] ....................................................... G05F 1/70
[52] U.S. Cl. ........................................... 323/211; 323/210
[58] Field of Search .................................. 323/209, 210, 323/211, 256, 258, 341, 257, 20; 361/91

[56] References Cited

U.S. PATENT DOCUMENTS

| | | | |
|---|---|---|---|
| 4,234,843 | 11/1980 | Gyugyi et al. | 323/119 |
| 4,686,630 | 8/1987 | Marsland et al. | 364/492 |
| 4,769,587 | 9/1988 | Pettigrew | 323/209 |
| 5,117,175 | 5/1992 | Pettigrew et al. | 323/256 |
| 5,402,057 | 3/1995 | D'Aquila et al. | 323/211 |
| 5,422,561 | 6/1995 | Williams et al. | 323/209 |
| 5,450,001 | 9/1995 | Konstanzer | 323/238 |

Primary Examiner—Peter S. Wong
Assistant Examiner—Bao Q. Vu
Attorney, Agent, or Firm—Leo J. Aubel

[57] ABSTRACT

This invention provides various methods and techniques for adaptive control of pole-top capacitors to compensate for inductive customer loads along distribution lines together with control of Var flow into supply lines to a distribution substation by a load tapchanging transformer control using measures of said Var flow as a voltage control bias.

23 Claims, 9 Drawing Sheets

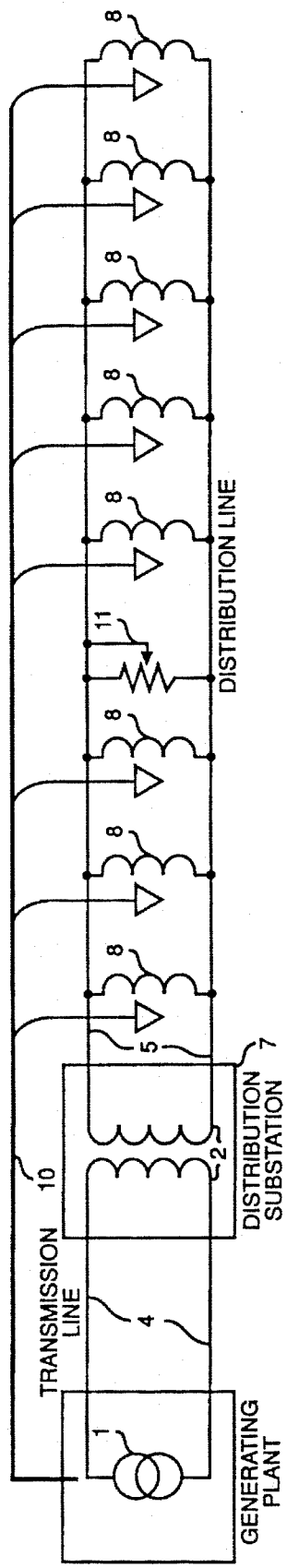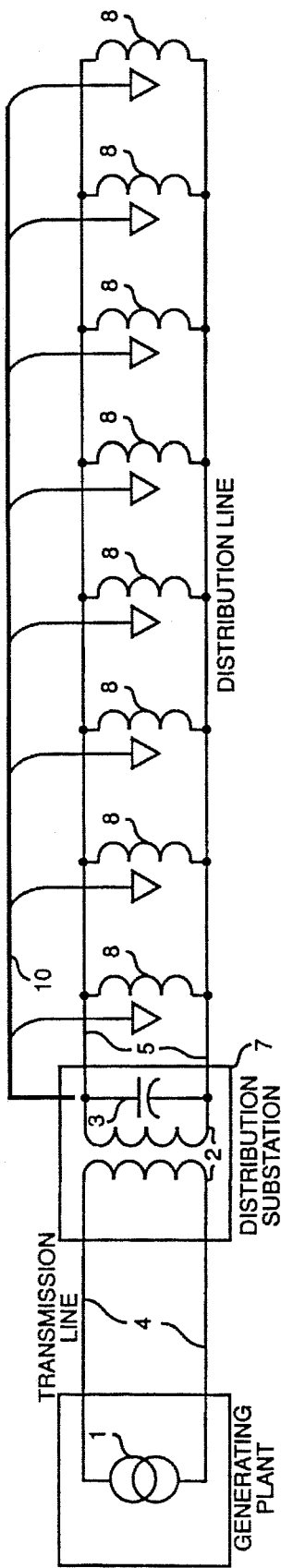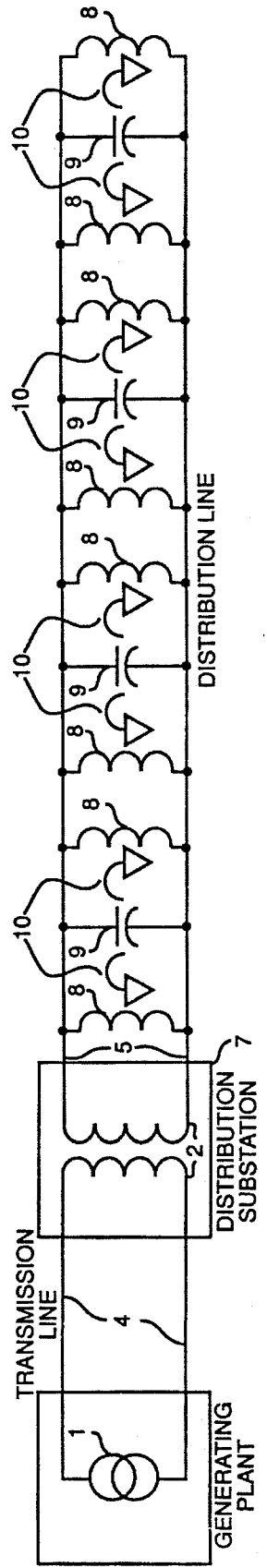
Fig. 6
a) SUPPLY OF VARS BY GENERATOR
b) SUPPLY OF VARS BY SUBSTATION CAPACITOR BANK
c) SUPPLY OF VARS BY POLE-TOP CAPACITORS 5,541,498

DISTRIBUTION CIRCUIT VAR MANAGEMENT SYSTEM USING ADAPTIVE CAPACITOR CONTROLS

BACKGROUND OF INVENTION

Var management in an electric utility network of companies can be divided between the management of Var flows produced by the movement of bulk power within power network 90 (see FIG. 1b)) and the Var flow produced by utility customer inductive loads such as motors. The management of the Var flow created in these two ways is tightly coupled by the fundamental requirement that throughout the entire interconnected power system, inductive Var flow will at all times precisely equal capacitive Var flow.

In the power network 90 (see FIG. 1b)), Vars are produced by currents flowing through the inductance of transmission and sub-transmission lines within the power network. This Var flow is both measured and modeled mathematically in computers contained within a supervisory control and data acquisition system (SCADA) 92. The inductive Var flow is compensated by capacitor banks located at substations within the power network 90. Management of this Var flow is outside the scope of this invention.

Capacitors to compensate for Var flows generated by customer loads are compensated by capacitors mounted either within distribution substations 7 or along distribution lines 5. The following discussion is limited to the management of the compensation for customer generated Var flows.

In the operation of electric power distribution circuits, motor and other reactive loads, which build up during the day, cause a flow of reactive current 10 (measured in volt-amperes reactive or Vars, see FIGS. 6(a), (b), and (c). This reactive current increases line and transformer power losses. Reduction of this reactive power flow has at least three advantages for the electric utility:

1) Elimination of the cost of the power lost due to uncompensated customer generated Var flow.
2) Prevention of the increase in temperature of equipment caused by uncompensated reactive power flow which otherwise decreases this equipment's life expectancy.
3) Elimination of generation required to supply the losses thus reducing the need for new generation as loads increase.

Reactive currents taken by motors and other inductive loads lags the voltage by 90°. The current taken by capacitors leads the voltage by 90°. Synchronous generators are capable of accepting a current which is in phase with the leading current taken by capacitors. As a basic principle, the leading currents taken by capacitors and by generators balance the lagging currents taken by inductive loads. It is the vernacular of the industry to speak of capacitors or generators as 'furnishing' Vars and inductive loads as 'requiring' Vars. Hereinafter the term 'providing leading Var flow' will be used as equivalent to the vernacular term 'furnishing' Vars and the term 'Var flow' used to indicate the presence of currents that may be leading or lagging. The term, 'Var' is used as the magnitude of Var flow computed from products of reactive current and voltage.

Voltage drop along a distribution line is caused by load current flowing through the series resistance, R, and reactance, X, of the line. A useful term in calculating line losses and voltage drop is the ratio of reactance to resistance, X/R, generally referred to as the 'X/R ratio'. The X/R ratio can be determined from the distribution line wire size and composition (copper or aluminum) together with the configuration and spacing of the power conductors and neutral or ground conductor, if used.

During the day increased current causes an undesirable voltage drop. This is often compensated for by raising the distribution substation output voltage giving nearby customers a higher than nominal voltage and distant customers a lower than nominal voltage. In order to maintain customer voltages within limits generally set by state regulation to +/−5%, on longer lines it may be necessary to use tapchanging regulators 11, see FIG. 6(a), at a point along a distribution line to further regulate the voltage. Such regulators make no improvement in inductive Var flow, and, in fact, add to the inductive Var flow due to their exciting current.

Consumer load devices operate most efficiently and have the longest life at rated voltage (generally 120 vac or a multiple thereof) and are adversely affected by variations in voltage. Customers therefore suffer in several ways with prior art technology, including:

1) Inefficient operation of equipment whenever the voltage is above or below rated voltage.
2) Shortened life of equipment due to high and low voltage variations.
3) Increased cost of electricity resulting from poor control of Var flow by the electric utility.

To control the flow of reactive current as well as the voltage along distribution circuits, power factor capacitors are added at selected points along the lines radiating from distribution substations. Said capacitors may be connected from each of three phase lines to neutral, if on a three phase circuit, or from the single line to neutral of a single phase circuit. Said capacitors are generally mounted at the top of poles carrying the distribution circuits and are known as 'pole-top capacitors'. Prior art practice is to switch some, but not all said pole-top capacitors.

Prior art pole-top capacitor switches are controlled in several ways:

1) by time clocks,
2) by controls that are sensitive to:
   a) voltage to neutral on a selected phase line,
   b) current in a selected phase line,
   c) outdoor temperature, and
   d) power factor or Vars, again using voltage and current from a selected phase line.
3) by capacitor controls responding to radio or telephone line signals from a SCADA where use is made of a mathematical model of the power distribution system, sampled telemetering data and historical load data to estimate the need for switching capacitors.

Each capacitor generally is connected and disconnected by means of a switch mechanism for each phase. It is the general prior art practice to switch all three capacitors on a three phase circuit with a single control.

When a bank is switched using a time clock, temperature or a voltage-sensitive control, a voltage transformer is required for a selected phase to provide operating power for the control. For voltage control the transformer furnishes information for measurement purposes. When switched using current, power factor or var control, both a voltage transformer and a current transformer or sensor are required for the selected phases.

Time clocks use historical data to determine capacitor switching operations and do not take into account actual daily variations in consumer load conditions and power line configurations. In addition, a long power outage may cause an error in the time setting, causing the capacitors to be connected at the wrong time of day. As a result, time clocks perform inadequately, but are widely used due to their relatively low cost.

Prior art voltage, power factor and var controls have fixed upper and lower voltage band-edges. These are the values of voltage that determine when to connect and disconnect the capacitor bank. The bandwidth is defined as the range within these two limits, where the measured voltage is said to be within limits, and no action is required of said control. These operating voltage points should not be confused with legal limits, often +/−5% of nominal voltage, as established by state statutes.

One problem with many prior art voltage responsive capacitor controls involves the change in voltage, B, that occurs when a capacitor bank is switched. This establishes an ideal bandwidth which however, being a function of the source impedance at the point of capacitor connection, tends in practice to be a variable. Any fixed control bandwidth must, therefore, be set above the highest expected voltage change, B, to prevent control instability.

Most distribution circuits are fed from one point at a time, however different substations can each feed a distribution line at two or more points. This permits the electric utility operators to change the feed to particular distribution circuits from one substation to another to balance loads on a substation, to maintain service to consumers during maintenance work, or to restore service when storms interrupt one of the feeder supplies. However, these changes can cause major differences in the source impedance at the capacitor location. Depending on the capacitor location, the source impedance, when fed from one substation, can vary by a factor of as much as five to one from that when fed from another substation. The resultant voltage change resulting from capacitor switching varies by the same ratio as the source impedance. Most prior art does not provide a way for a voltage sensitive capacitor control to automatically accommodate the requirement for a variable bandwidth.

Since the bandwidth cannot be accurately calculated, a common practice is to make the best estimate possible, then double the bandwidth. The result is a very crude correction of voltage and power factor, as compared to that desirable.

Power factor-sensitive or Var-sensitive controls are more costly than either a time clock or a voltage-sensitive control. U.S. Pat. No. 4,769,587 discusses a prior art power factor control in detail.

Many utilities have established a sophisticated mathematical model of the entire power system. The model operates using a network of computers located at generating stations, substations and a central control location. Each electric utilities computer system may communicate with neighboring systems forming a communications and computational system paralleling the power network 90. For greatest simplicity herein, this computational and communications network is referred to as SCADA 92 (see FIG. 1$b$)).

As explained above, one part of the mathematical model measures and controls the Var compensation of the Var flow generated by currents flowing in the power network of transmission and sub-transmission lines. In terms of the number of components and lines, the power network 90 is relatively simple as compared to the totality of distribution lines supplying customer power. It is the present practice to fully measure the power flows within the power network 90 and to control the switching of capacitor banks and control of static Var equipment. This transmission and sub-transmission system is well defined and not often changed. As a result the mathematical models are quite accurate.

Attempts are made to model distribution lines. The mathematical model selects capacitors along distribution lines for switching so as to establish minimum customer voltage variation and minimal distribution line losses. These customer related factors are not measured, however, but based on survey voltage studies of short duration and sometimes using real time inputs from a very small sampling of distribution voltage points. The apparent excellence of the results of the mathematical model may give a false sense of the actual real world quality of customer voltage variation and actual real world reduction of line losses.

Even if the mathematical model is without error for one distribution of customer load, this load distribution is continually changing and these changes are not monitored by the prior art systems. Moreover, there are long term changes in load pattern as new homes, commercial and industrial buildings are built. The burden of continually changing the mathematical model is expensive and time consuming and may not be kept up to date in actuality, especially at times of downsizing of utility manpower.

It is the prior art practice by many utilities to place a large portion of capacitors for customer load Var support at substations. One reason for this placement is the greater ease of remote control of capacitor switching of equipment at substations as compared to pole-top capacitor installations. Capacitors at substations are generally more expensive per kilovar of capacity, however, when located at substations.

Distribution circuit losses may be typically 6% of the generated power for a typical electric utility using prior art capacitor placement and control. Improved distribution line Var control could result in reduction of losses by 1%, say from 6% down to 5% The total power generated in the United States in one year may be $500\times10^9$ kilowatt hours (kwh). At 8 cents per kwh a 1% reduction in losses represents an annual savings of $400 million.

Prior art distribution substations 7 (see FIG. 1($b$) commonly use load tapchanging transformers (LTCT) 100, controlled by load tapchanger controls (LTC) 162 (see FIG. 2). An analog type of LTC is described in U.S. Pat. No. 3,721,894 issued to R. W. Beckwith, the inventor thereof.

A digital LTC is described in U.S. Patent No. (U.S. patent application Ser. No. 08/152,001) filed Nov. 9, 1993 for Microcontroller-Based Tap-Changer Controller Employing Half-Wave Digitization Of A. C. Signals, filed in the name of Murty V. V. S. Yalla et al wherein R. W. Beckwith is named as one of the co-inventors.

SUMMARY OF INVENTION

This invention provides three levels of Var flow control available in modular form.

A first level of Var flow control is established by use of a first inventive subsystem consisting of use of adaptive capacitor controls (ACC's).

A second improved level of Var flow control is established by use of a second inventive subsystem which combines use of the ACC's and load tapchanger controls wherein the LTC's use fixed setpoints for desired Var flow.

A third level of greatest improvement in the control of Var flow further combines an inventive use of a SCADA system to continuously vary said LTC setpoints.

This invention comprises a system utilizing pole-top capacitors connected along distribution lines and eliminates most, if not all, distribution substation capacitor banks thereby facilitating utility wide Var control. The inventive capacitor control system includes ACC's for sensing voltage, using inventive methods of responding to voltage fluctuations, so as to maintain a more constant voltage along a power distribution circuit. The inventive system further includes inventive LTC's for measuring the Var flow into a power network together with accepting setpoints for said Var flow, thereby determining desired Var flow through transformers. The LTC's lower the distribution line voltages and the ACC's selectively switch ON capacitors where the voltage is the lowest to increase Vars. The LTC's raise the distribution line voltages and the ACC's selectively switch OFF capacitors where the voltage is the highest to decrease Vars. Thus the voltage level 'communicates' the need for more or less Vars, from said LTC's to said ACC's via the existing distribution lines and no further communications is required either from the LTC's to the ACC's or between the ACC's.

The foregoing features and advantages of the present invention will be apparent from the following more particular description of the invention. The accompanying drawings, listed hereinbelow, are useful in explaining the invention.

DESCRIPTION OF DRAWINGS

Novel features and advantages of the present inventive method will become apparent to those skilled in the art from a reading of the following detailed description in conjunction with the accompanying drawings, wherein:

FIG. 6 illustrates var flow to inductive loads on distribution lines with FIG. 6(a) specifically depicting load generated Var flows supplied by the generator, FIG. 6(b) specifically depicting load generated Var flows supplied by a substation capacitor bank and FIG. 6(c) specifically depicting load generated Var flows in accordance with the present invention;

DESCRIPTION OF INVENTION

U.S. Pat. No. 5,315,527 issued to Robert W. Beckwith on May 24, 1994 (also the inventor of the present invention) entitled "METHOD AND APPARATUS PROVIDING HALF-CYCLE DIGITIZATION OF A-C SIGNALS BY AN ANALOG-TO-DIGITAL CONVERTER" is included herein as a reference.

U.S. patent application Ser. No. 08/246,630 filed May 20, 1994 and entitled "APPARATUS AND METHOD FOR SAMPLING SIGNALS SYNCHRONOUS WITH ANALOG TO DIGITAL CONVERTER" is also included herein as a reference.

Most state statutes require user voltages to be 120 V ±5%, as measured at the distribution voltage level and scaled to the user voltage level. Depending on the length of the distribution line, the voltage drop at peak load, due to the impedance of the line, may be more or less than that allowed. This invention uses an ACC to switch distribution power factor correction capacitors 9 (see FIG. 6), usually mounted on pole tops, as the voltage changes, thereby raising the voltage and compensating for the line drop and at the same time holding down the increase in current along the distribution line required to supply the reactive requirements of inductive loads.

Figure 5:
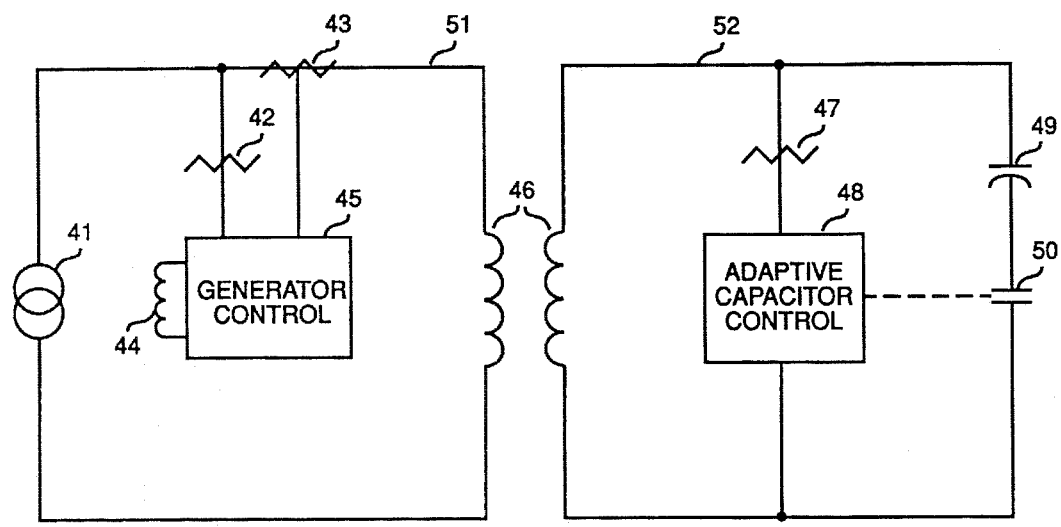
FIG. 5 is a diagram of an elementary power system using fixed ratio transformer between a generator and a distribution line in which the generator control varies the voltage to cause capacitors to switch on or off so as to regulate the generator Vars.

FIG. 6 a) illustrates the provision of all leading Vars 10 by a generator as might be the case for a small isolated power system, as shown in FIG. 5, using no capacitors for Var flow correction. As can be seen the Vars must flow from the generator 1 at generating plant 6, through transmission line 4, through transformer 2 at distribution substation 7 and via distribution line 5 to inductive loads 8.

In FIG. 6 b) the leading Vars 10 flow from a substation capacitor bank 3 via distribution line 5 to inductive loads 8. Note that while the Vars are eliminated in the transmission lines 4, the typical losses there are only 2%. The Vars still must flow from substation 7 to customer loads 8 through distribution line 5 where, as stated above, the losses are typically 6%.

In FIG. 6 c), using the inventive system, the leading Vars 10 flow only a relatively short distance in distribution line 5 from pole-top capacitors 9 to provide compensation for the inductive customer loads 8 which are nearby each pole-top capacitor 9. Here the transmission line 4 losses due to customer generated reactive current are eliminated and at the same time distribution losses are brought to the lowest minimum possible using banks of capacitors each of sufficient size to provide the leading Var flow required for a number of nearby inductive loads.

Figure 1:
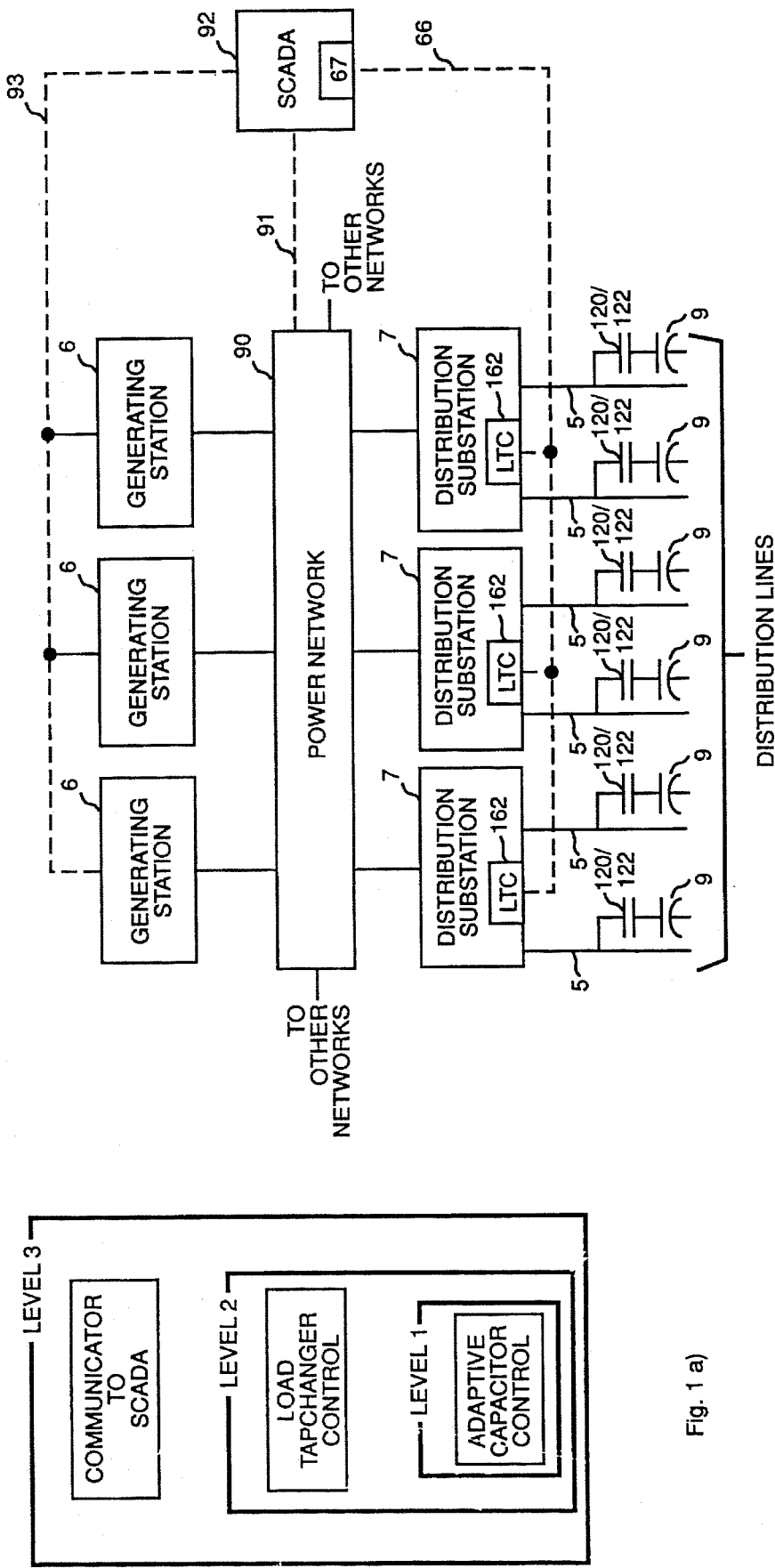
FIG. 1(a) illustrates the relations between three levels of the inventive system and the adaptive capacitor controls, the load tapchanger control and SCADA.
FIG. 1(b) illustrates the components of the overall level 3 system for Var control.

FIGS. 1(a) and (b) illustrates the relations between said systems and components of the systems as described above under SUMMARY OF INVENTION. The choice between the entire system and the two subsystems is determined by the balance in the cost of the three choices against savings obtained by each of the three levels of Var flow control.

LEVEL 3 VAR FLOW CONTROL

Figure 3:
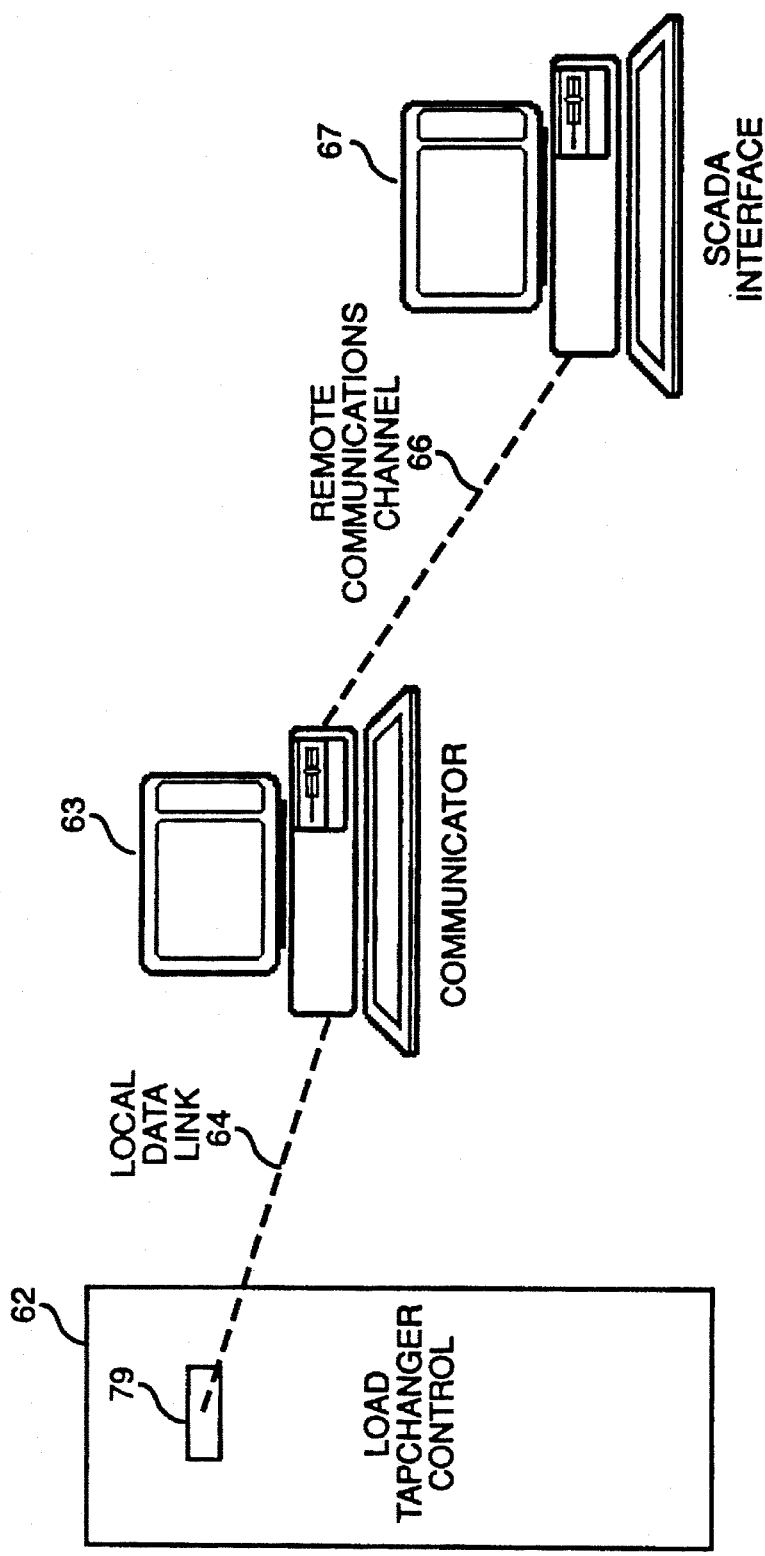
FIG. 3 illustrates the connection of a LTC to a communicator computer and the communicator computer to a SCADA interface device.

FIG. 3 illustrates the operation of communicator computer 63 connected via local data link 64 to entry device 79 on load tapchanger control 162 located at substations 7 (see FIGS. 1(b) and 6). FIG. 3 also shows the remote communications channel 66 to a SCADA interface device 67 (see FIG. 1(b)). FIG. 1(b) shows the SCADA receiving data from the generating stations 6 and the power network 90 via communications circuits 93 and 91 respectively. The SCADA performs complex calculations on this data, considering, for example, the effect of Var flow through power network 90 from other networks via connections shown in FIG. 1(b) using data obtained via communications circuits 91. The SCADA 92 then sends continuously varying Var flow settings to controls 162 at each substations 7, using communications circuits 66, so as to best provide the desired Var flows into the power network 90 from each said distribution station 7.

If the SCADA should fail, the controls 162 will each revert to fixed Var flow setpoints used for level 2 control and thus SCADA failure results only in a remission from Level 3 control to level 2 control (see FIG. 1(a). In contrast many types of SCADA control in prior art use directly control all capacitor switching so that a SCADA failure results in a total loss of customer generated Var flow control. Some even go so far as to make LTC's a SCADA function so that a SCADA component failure can interrupt voltage control.

The invention also comprises an LTC 162 (see FIG. 2) measuring the Var flow into the transmission system 4 (see FIGS. 6(a), (b), and (c)) from the distribution substation 7. Said LTC 162 raises the output voltage to the distribution lines 5 (FIGS. 6(a), (b) and (c)) to switch the capacitors OFF and lowers said voltage to switch the capacitors ON. The effect of said voltages to switch capacitors 9 has a time factor and the inventive LTC control 162 adapts this time factor in order to prevent overshoot as will be described in more detail hereinunder.

FIGS. 7(a) and (b) show diagrams including watts and Vars combined for a section of a distribution line, as for example one capacitor 9 of FIG. 6 c) together with two inductances 8, one on either side of capacitor 9. FIG. 7(a) is for a distribution line with an X/R ratio of one and FIG. 7(b) is for a distribution line with an X/R ratio of two, where X is the series inductive reactance of the line per unit of length and R is the series resistance of the line per unit length.

The vertical axis of FIGS. 7(a) and (b) is the total watts load and the horizontal axis is the Vars, with lagging Vars to the left and leading Vars to the right, as shown. Lines are shown for 95%, 90%, 80%, 70.7% and 50% leading and lagging power factors. The vertical line starting with zero per unit (p.u.) Vars is also the line for 100% power factor. The lower horizontal lines from zero p.u. Vars are also the lines for zero power factor; lagging p.f. to the left and leading p.f. to the right.

The dot-dash line labeled, 0 ▲E %, indicates no deviation from one per unit volts at the point of capacitor connection. As transformed down for household use, one per unit volts is generally defined as 120 VAC. Other dot-dash lines are labeled for positive voltage rises and drops in percent of one per unit volts as caused by the combined flow of watts and Vars.

Figure 7:
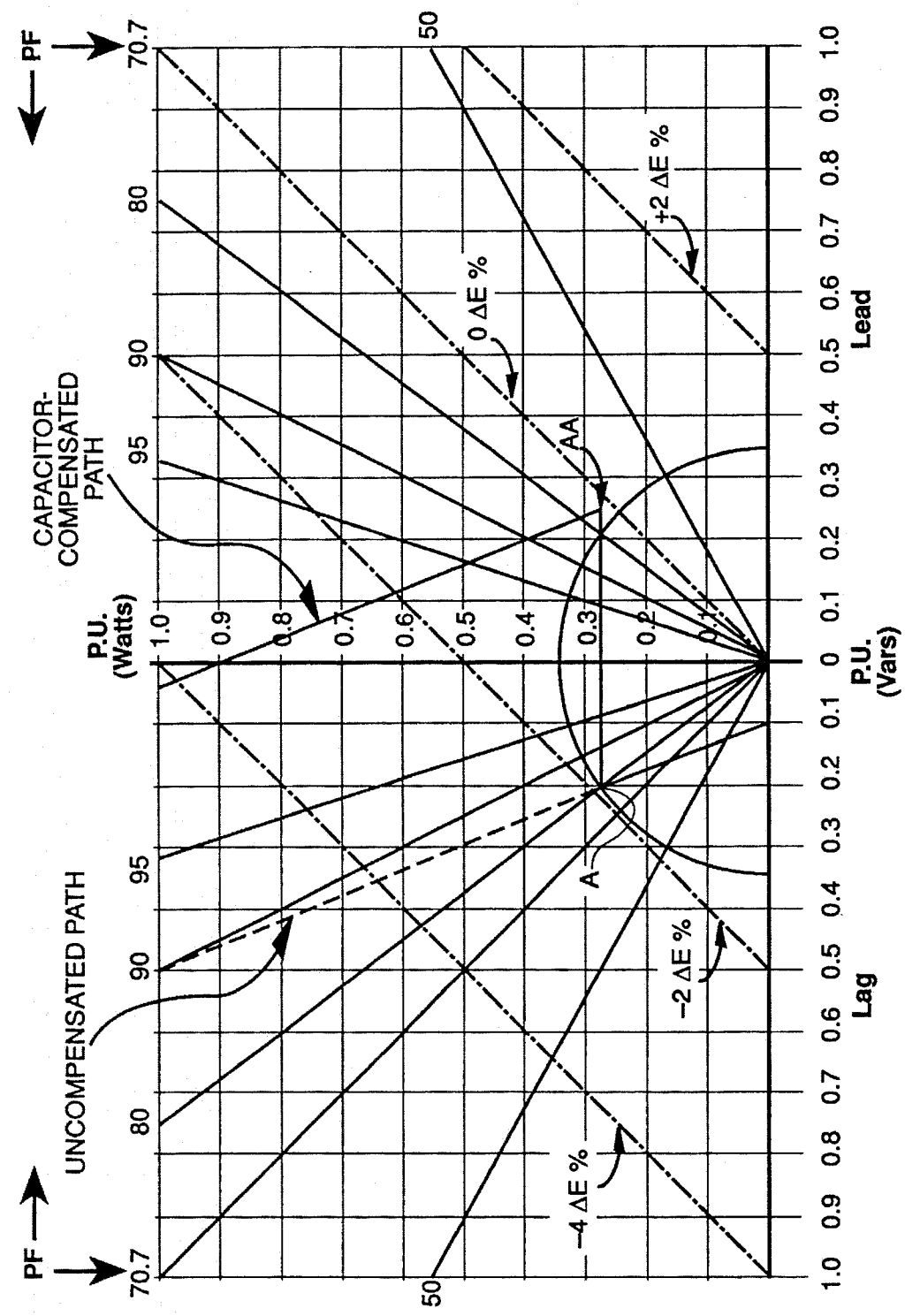
FIG. 7(a) is a graph comparing capacitor switching based on Vars, power factor and voltage for a distribution line having an X/R ratio of one.
FIG. 7(b) is a graph comparing capacitor switching based on Vars, power factor and voltage for a distribution line having an X/R ratio of two.
Figure 7:
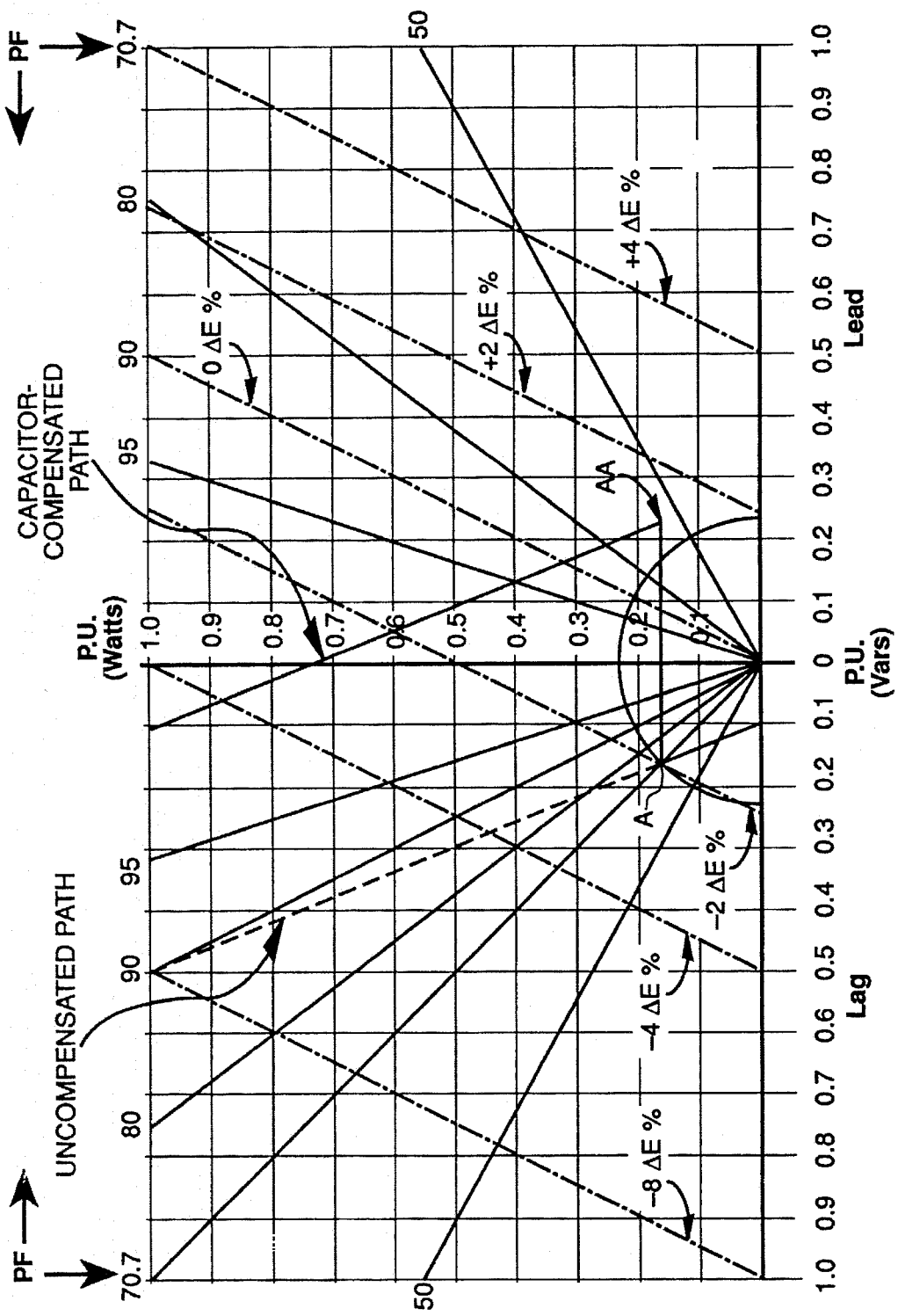

The load path on the graphs of FIG. 7 a) and b) at any given location and given day may follow any path from the lowest load point to the highest load point. In this illustration a straight line path is used, one with capacitor compensation and one without. The Vars taken by a power factor capacitor is a function of voltage, but since the voltage variations are rather small, the load line will move to the right by approximately the Var rating of the capacitor when the capacitor is switched ON. The compensated load path will then be approximately parallel to the uncompensated path, but moved to the right from point A to point AA by the Var flow through the capacitor.

In FIG. 7(a), a line is shown starting at 0.1 p.u. Vars lagging as representing the exciting current of voltage dropping transformers which are supplying essentially zero watts load to customers served by the transformers, as during early morning hours. The uncompensated line extends linearly upward to approximately 90% power factor lagging at a peak load condition as one likely path for a varying load to follow from early morning to a mid-day load peak. A capacitor-compensated line is shown which adds approximately 0.5 per unit leading Vars when the load reaches point A. Point A is a point where a capacitor control alternatively recognizes one of the three following conditions:

a) A voltage drop of 2% or 2.4 Vac with 120 Vac as nominal.

b) A detection of 0.2 per unit lagging Vars.

c) A detection of greater than 0.35 per unit current and 80% power factor. The semi-circle on FIGS. 7 (a) and (b) shows a current magnitude limit of 0.35 p.u. for any power factor angle as used in some prior art power factor controls.

In a typical distribution capacitor location, the load will vary from nearly zero per unit watts at night to one per unit watts at some point during the day where one per unit watts it defined as an expected daily maximum watts. As illustrated in FIG. 7 a) and b), any one of several prior art capacitor controls with fixed settings can be adjusted to switch at a given point as the load rises from zero to one per unit watts. It can be expected that most controls follow the same path in reverse as the load decreases from one per unit watts to zero watts. From this one can conclude that no advantage is lost in using voltage switching a) as compared to Var or power factor switching and many inventive advantages are gained as described herein.

FIG. 7 b) illustrates the same relationships as FIG. 7 a) except for lines with an X/R ratio of two.

Note that the slope of the dot-dash voltage difference lines shown in FIGS. 7 a) and b) changes with the X/R ratio. The values of voltage difference shown are for an arbitrary magnitude of R and X chosen for illustration purposes. These values of voltage change may be multiplied by any number to obtain a graph pertaining for a point on a power distribution line with a selected X and R magnitude of source impedance.

Figure 2:
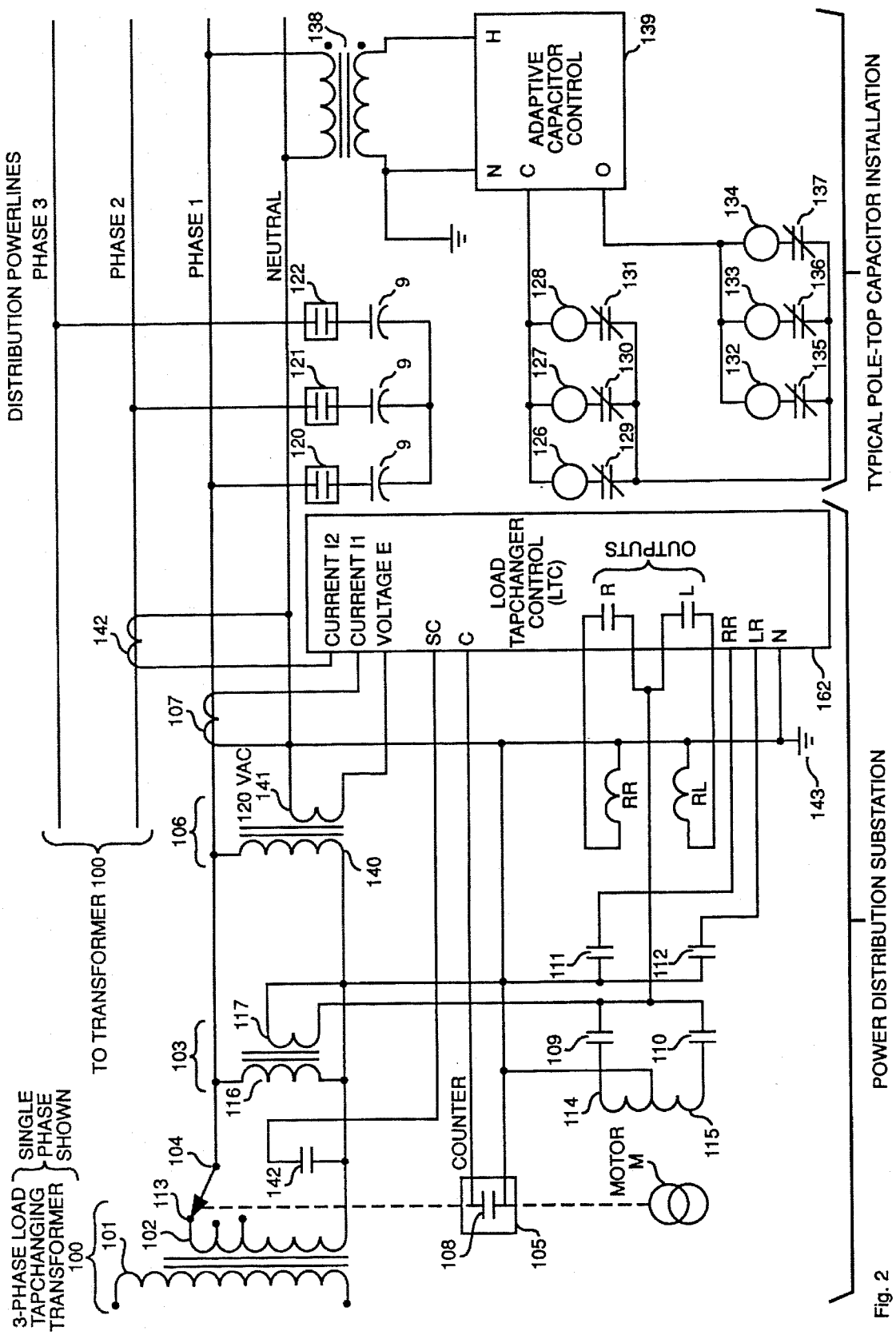
FIG. 2 is a drawing showing the inventive adaptive capacitor control connected to an electrical power distribution circuit, together with an LTC transformer and with the inventive LTC in a substation supplying voltage to said ACC.

FIG. 2 shows a power distribution substation circuit providing tapchanger control of a LTCT 100 (shown for simplicity in single phase form). Transformer 100 has a three phase primary winding 101, often 69, 115 or 132 Kv, phase to phase. Secondary 102 has taps 113 on each of three phases selected by three phase tapswitch 104, in turn driven by motor M having a drive mechanism 105 with counter contact 108, counter contact 108 closing briefly when each tapchange is mechanically committed. Motor M drive mechanism further selectively has a contact 142 movable so as to be closed only on a tap position selected as one being often used and therefore suitable for frequent correction of a tapchange keep track procedure to be described hereinunder. Motor M is powered by single phase transformer 103 having primary 116 receiving voltage from phase 1 to neutral 143 of the voltage controlled output of transformer 100 together with secondary 117 supplying motor M voltage, generally at 120 or 240 Vac. Motor M may have a winding 114 which, when powered, causes motor M to run in the direction of increasing tap position and having a winding 115 which, when powered, causes motor M to run in the direction of decreasing tap position. In any instance, motor direction is obtained by use of one or the other of two contact closures. Transformer 106 provides 120 Vac from secondary winding 141 to tapchanger 162 in response to primary 140 connection between phase 1 and neutral 143. The LTC 162 provides output raise (R) contacts and lower (L) contacts which correspondingly operate motor starter relays RR and RL. Contact 109 on motor starter relay RR causes the motor to move in the raise direction when relay RR is operated and contact 110 on said motor starter relay RL causes the motor to move in the lower direction when relay RL is operated. Isolated motor starter RR contact 111 closes upon operation of said starter RR connecting tapchanger control binary input RR to neutral 143 and isolated motor starter RL contact 112 closes upon operation of starter RL connecting tapchanger control binary input LR to neutral 143. The LTC 162 senses closure of contact 111, followed by closure of counter contact 108 and increases the record of tap position by one. The LTC 162 further senses closure of contact 112, followed by closure of counter contact 108 and decreases the record of tap position by one. Adjustable switch 142 selectively is set to a frequently used tap position and connected to tapchanger control 162 binary terminal SC. The identity of said frequently used tap position is entered into said LTC 162 and said tapchanger control corrects the record of tap position, if necessary, each time the tapswitch is on said frequently used tap position.

FIG. 2 further shows a typical pole-top capacitor installation together with phase 1, phase 2, phase 3 and neutral 143 conductor of a power distribution line fed from the before mentioned power distribution substation. Phase 1 and neutral 143 conductors are shown connected appropriately to the substation circuitry. Phase 2 and phase 3 are not shown connected to transformer 100 which for simplicity is represented in single phase form. Power factor correction capacitors 9 are shown connectable through contacts 120, 121, and 122 (120/122) to distribution circuits phase 1, phase 2 and phase 3. The ACC 139 selectively closes a circuit from ACC 139 terminal H to C to operate magnetic devices 126, 127, and 128, thereby closing contacts 120, 121, and 122 and connecting the capacitors 9 to said distribution powerlines and closes a circuit from ACC 139 terminal H to O to operate magnetic devices 132, 133, and 134 thereby opening contacts 120, 121, and 122 and disconnecting said capacitors 9 from said distribution powerlines.

After devices 126, 127 and 128 have performed their closing function, they latch closed and contacts 129, 130 and 131 open, removing power from said devices. After devices 132, 133, and 134 have performed their opening function, they latch open and contacts 135, 136, and 137 open, removing power from said devices.

LEVEL 2 VAR FLOW CONTROL

FIG. 2 shows the LTC 162 at substations 7 of FIG. 1(b) and details the addition of the LTC to the ACC of FIG. 1(a) thereby establishing Level 2 of Var flow control. The LTC measures the Var flow into the power network 90 from distribution substation 7 (see FIG. 1(b) and controls said measured flow by voltage bias changes to the distribution lines fed by substation 7 and to each ACC 139 controlling switching of capacitors 9 connected to said distribution lines 5. Failure of any single LTC 162 will degrade the flow of Vars into the power network 90 only at the substation 7 where LTC 162 is located.

Distribution lines 5, having pole-top capacitors 9 switched by said ACC 139, are fed from a distribution substation, 7 (see FIG. 1(b), at voltages commonly between 4 to 34 Kv. This voltage is generally stepped down from a higher voltage, often termed a sub-transmission voltage, and the sub-transmission voltage stepped down from a further higher transmission voltage together forming the power network 90 of FIG. 1(b).

As illustrated by FIG. 2, said voltage stepdown at distribution substations 7 is often accomplished by LTCT's 100 having LTC's 162. As is well known, LTCT 100 may be replaced by a fixed transformer feeding tapchanging regulators (LTCR's). Hereinafter the term 'tapchanging unit' will refer either to an LTCT or to a fixed transformer feeding tapchanging regulators (either one three phase regulator or one single phase regulator for each of the three phases). In the inventive system, each tapchanging unit requires one LTC. In general one LTC is required for a LTCT or a three phase regulator and one LTC for each single phase regulator.

In the preferred embodiment, the LTC determines the var flow into the transmission system supplying the tapchanging unit controlled by said LTC using one said tapchanging unit output voltage signal and two said unit output phase current signals. In addition said LTC determines the tapchanging unit switch position, selectively using the inventive keep track methods described hereinunder, and uses this along with a mathematical model of said unit and said voltage and current signals to determine the three phase Vars flowing into or out of said unit primary. Alternatively the LTC obtains this primary Var flow information from alternative external Var flow sensors.

The LTC voltage setpoint is then set and the distribution line voltage raised to reduce leading (capacitive) Vars flowing and lowered to increase the leading Vars flowing. The resultant shift in voltage is effective in causing power factor capacitors controlled by ACC's 139 to switch ON in response to a lower than average voltage and OFF in response to a higher than average voltage.

Users of electricity operate their loads in ways that are known statistically but not specifically on any particular distribution line on any particular day. The capacitor controls and transformer controls described here respond to actual voltage conditions and therefore are a much better indication of user loads near the capacitor than are statistical data or a mathematical model.

A number of mnemonic elements used to explain the inventive process are listed in the following Table 1.

TABLE 1

| | |
|---|---|
| VU | upper absolute voltage limit. |
| VL | lower absolute voltage limit. |
| v | any voltage amplitude, generally measured every cycle. |
| V | running average of voltage, v. |
| N | desired rate of switch operations in D days. |
| B | the absolute value of the voltage change caused by capacitor switching. |
| R | range of voltage variation at a capacitor location. |
| C | count of actual switch operations per day (either 'open' or 'close' represents an operation). |
| H | integrating timer. |
| ▲H | amount by which H is incremented. |
| H' | the limit of H that results in a switch operation when exceeded. |
| n | number of digital samples in a half cycle measurement of voltage. |
| d | rate of decrementing H. |

The ACC uses an adaptive function of time and voltage to switch distribution line capacitors ON and OFF as described in more detail hereinunder.

Figure 8:
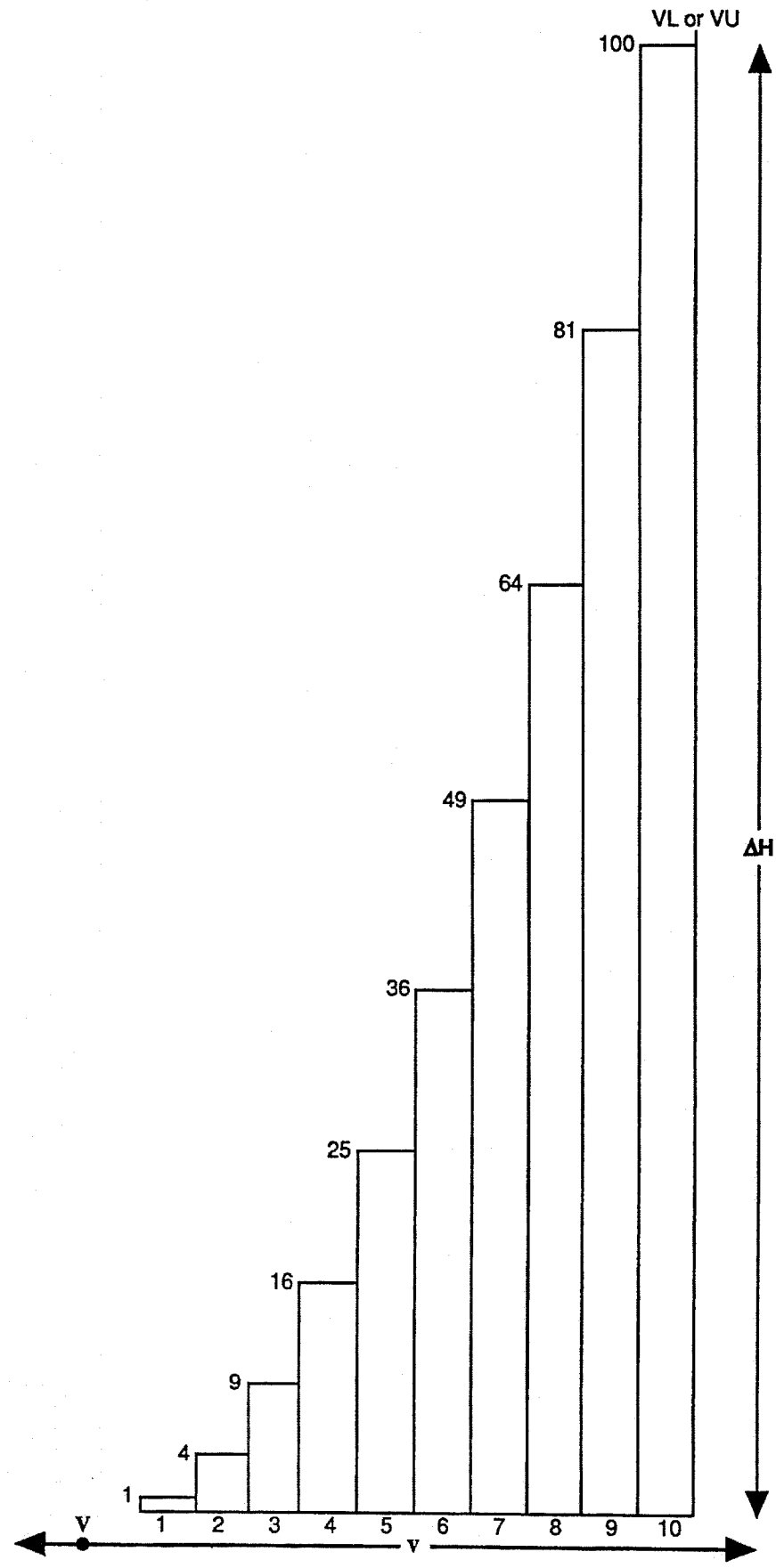
FIG. 8 shows ▲H as a function of V - v for v between V and either VU or VL.

FIG. 8 shows the timing diagram used to increment H (see Table 1) upward following each measurement of voltage v whenever, v, is between the absolute low voltage limit VL and the average voltage, V, and when the capacitor switch is open. Alternatively FIG. 8 shows the timing diagram used to increment H upward following each measurement of voltage, v, whenever v is between the absolute upper voltage limit VU and the average voltage, V, and when the capacitor switch is closed.

Note that FIG. 8 shows the voltage between V and either VU or VL. As is necessary in any digital process, this voltage range, which is fundamentally analog in nature, is divided into discrete increments. For clarity FIG. 8 shows the voltage range divided into 10 increments. This number of increments is arbitrary, however, and generally will be much larger than 10, say 100 and is given by the term 'm' in the equation:

$\blacktriangle H = m \times X/Y$ where:

$X=v-V$ and denominator $Y=VU-V$ when the capacitor switch 120/122 is closed, and $X=V-v$ and denominator $Y=V-VL$ when said switch is open.

In order to reduce the size of a microprocessor program using these equations, it is desirable to avoid floating point mathematics and use only integral numbers. Note that X/Y will range from 0 to 1 in value. Since numbers are rounded down to the next lower integer, the integer value of X/Y will be zero except at the limit value where X/Y=1. For this reason the product m×X is computed first. An examination of the function m×X/Y so calculated shows that either m or Y will determine the number of integer values obtained, depending on which is the smaller.

Now X and Y are obtained from values of voltage from a measurement process. The inventive measurement described herein and in referenced patents and patent applications provides a typical resolution for Y of 2700 discrete integer values. With a choice of m=100, m will therefore determine the resolution of the graph of FIG. 8 into 100 bars for most positions of V between VL and VU. Only where V is very close to either VL or VU will the number of bars be determined by a value of Y which is smaller than m.

Thus an integer, starting with 1, is assigned to each increment, progressing from V to VL or VU. Whenever the voltage, v, is measured within an increment for opening or closing the switch, H is incremented upward by the square, $\blacktriangle H$, of the integer number of the increment.

This invention is not limited to the use of the square relation between $\blacktriangle H$ and the increment number. A second choice is the cube or another power, not necessarily an integral power. A third choice is to double $\blacktriangle H$ in each progression upward in the number of the increment. A fourth choice is to have a table of values of $\blacktriangle H$ chosen with no particular mathematical relation to the number of the increment. The invention is not limited to these choices.

Whenever the measured voltage, v, is between V and VL when the switch is closed or whenever the measured voltage, v, is between V and VU when the switch is open, H is decremented by H'/d. Divisor, d, is chosen to limit the resetting of the timer integral, H, by short voltage spikes as caused by motor starting.

Whenever H exceeds H' and the switch is open, the switch is closed. Whenever H exceeds H' and the switch is closed, the switch is opened.

Once a day, the number of switch operations (open or close), C, is used to adaptively adjust H' using the recursive equation:

$H'=H'+B(D \times C-N)$

Here again, integer numbers are used and D×C is determined first, secondly N is subtracted, thirdly the answer is multiplied by B and lastly the answer added or subtracted from the old value of H' to obtain the new value of H'.

Figure 9:
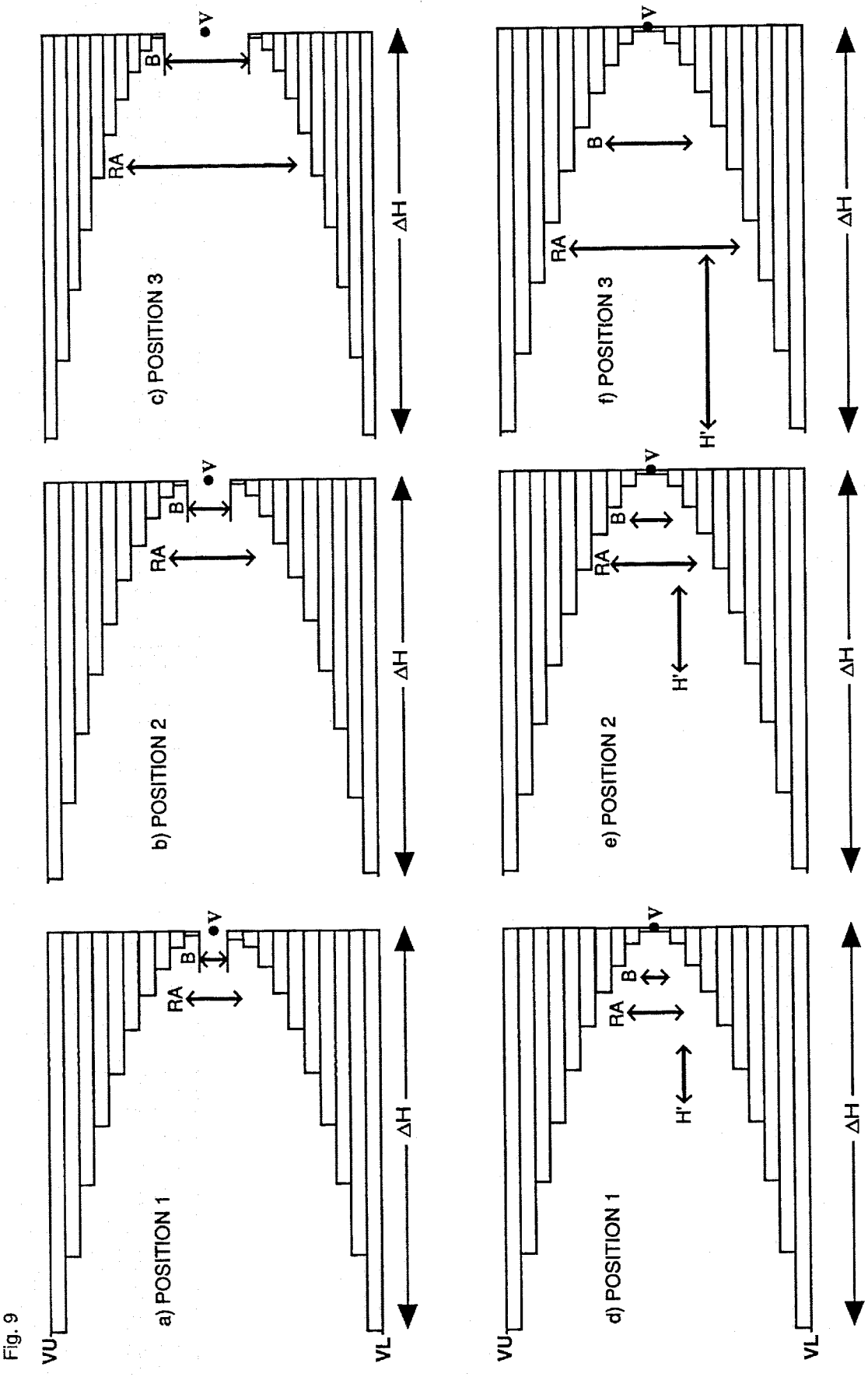
FIG. 9(a), (b) and (c) shows timing diagrams for three capacitor banks spaced at varying distances along a distribution line from a substation using algorithms spaced around the change in voltage, B, caused by capacitor switching.
FIG. 9(d), (e), and (f) shows timing diagrams for three capacitor banks spaced at varying distances along a distribution line from a substation using algorithms spaced around the average voltage V.

FIG. 9 shows timing diagrams for three pole-top capacitor banks 9 spaced at varying distances along a distribution line 5 from a substation 7. Timing diagrams are shown at FIG. 9 a) and d) for position 1 along line 5; at FIG. 9 b) and e) for position 2 along line 5 and at FIG. 9 c) and f) for position 3 along line 5. FIG. 9 shows the square law choice for variation of $\blacktriangle H$ for the integrating timer either timing down towards a chosen VL of 114 VAC from the average voltage, V, at 120 VAC for closing capacitor switches 120/122 or timing upward towards a chosen VU of 126 VAC for opening capacitor switches 120/122. Curves are shown for three capacitor locations spaced at varying distances down a distribution line from a substation so that the source impedance seen at Position 2 is greater than that at Position 1 and position 3 is greater than that at Position 2. The voltage change, B, at each position as the capacitor switches ON or OFF, and the daily ranges in voltage, RA, therefore are shown increasing in magnitude from Position 1 to 2 and from 2 to 3.

The integrating timers, H, are incremented upward by $\blacktriangle H$ after measuring the amplitude of each cycle of the power frequency, or decremented downward by H'/d as explained above. Since all capacitor controls 139 have the same non-linear characteristics, a given voltage variation, as a percentage of the expected daily variation, will cause H' to increment upward faster in Position 2 than in position 1 and again faster in Position 3 than in position 2.

The expected voltage variation downward in a typical morning, when it is desirable to close the capacitor switches 120/122, can expected to be most consistent when expressed in terms of percentage of the total expected voltage variation. In order for the turn on time to be the same at each of the three locations, therefore it will be expected that H' will tend to converge to a higher magnitude at Position 2 than in position 1 and a higher magnitude at Position 3 than in position 2.

On the other hand, a fixed voltage variation downward, such as produced by tapchanger control 162 (see FIG. 2) will cause H to increase at the same rate at all three positions. Therefore control 162 will be most likely to close capacitor switches 120/122 at Position 1 first when asking for more Vars. This is as desired for utility operating reasons.

In a similar manner, an increase in voltage by control 162 to reduce Vars will most likely open the capacitor switches 120/122 at Position 1 first.

It is quite necessary to be able to open all switches 120/122 under light load conditions in order to prevent generator instability due to excessive leading load current. It is clear from FIG. 8 that an increase in voltage by control 162 will accomplish this. In the extreme, the turn off time will decrease to a selected time, preferably one second, if the voltage is raised above 126 VAC. The non-linear timer, H, increases very rapidly for large excursions from V, therefore it is most likely that capacitors 9 will switch off before the relatively slow tapchanger mechanisms controlled by LTC 126 can reach 126 VAC.

Reasonable assumptions can be made assuming customer load variations and the controls response.

It is known that the voltage variation, which results from either user loads changes or by capacitor 9 switching, is lower at capacitor 9 locations near the source of power and larger at capacitor 9 locations far from the source of power. Assume the same number of desired switch 120/122 operations per week have been specified for each ACC. Since the rate of timer integration is preferably proportional to the square of the voltage variation from the average voltage, V, H' will converge to a smaller number at nearby capacitor 9 locations and to larger numbers at the most remote capacitor 9 locations so as to provide the same time of response to typical daily load variations.

A small offset of voltage by the LTC in response to Var flow bias is most likely to operate the nearby capacitor 9 banks first. On the other hand, if loads at another capacitor 9 point are higher or lower than statistically expected, the timer may already be nearly timed out and a small var bias change in voltage may result in that capacitor 9 reacting first. This is as it should be since the ACC's take actual loads into consideration and are not operated in accordance with statistical data that may be quite erroneous at a particular day and capacitor 9 location.

Assume that early in the morning the LTC 162 measures a need for more leading Var flow from the distribution capacitors 9 and that the voltage has not sufficiently decreased at enough capacitor 9 locations to supply the Var flow. The LTC will lower the supply voltage in proportion to the required leading Var flow. The nearby capacitors 9 will likely be the first to switch on, as is desired. As soon as the capacitors 9 switch on, the need for leading Var flow will no longer be measured by the LTC 162 which will eliminate the Var flow voltage bias and bring the voltage back within the original band.

The question of how fast the system will respond to a need for Vars can be examined by assuming that only the tapchanger 162 time limits the speed. The voltage could be lowered at the tapchanger switch 104 maximum rate to below 114 VAC at which voltage any ACC will switch ON in one second. The need for leading Var flow would then disappear and the voltage would be moved to normal, again at the tapchanger switch 104 limiting speed. If less than all of the capacitors 9 were required to meet the Var flow requirement, however, this speed could result in hunting. The ratio of distribution line voltage drop to Var flow requirement is therefore a LTC setpoint number that must not be so high as to cause hunting, therefore the setting is made adaptive in LTC 162 by detecting overshoot and reducing the ratio gradually until no hunting occurs.

There is concern about having too many capacitors 9 connected during very light conditions and causing generator instability. Many utilities have perhaps 40% of their distribution line capacitors located near to the source and not switched. By converting more of these to switched capacitors 9 and using the inventive control with the precision voltage measurement capability, more capacitors 9 can be controlled by voltage and assured to be ON or OFF as required. Again, raising the source voltage to 126 volts during light load, whenever it occurs, assures all switched capacitors 9 being OFF.

THE ACC FOR LEVEL 1 VAR FLOW CONTROL

In FIG. 1(a), Level 1 Var flow control shows the use of the ACC 139 (see FIG. 2) and supplies leading Var flow for inductive loads 8 near to the capacitor 9 location (see FIG. 6 c). This level will establish a uniform voltage level along the distribution lines 5 as best can be established by switching the number of capacitors 9 of fixed size along the line. The level will statistically tend towards zero Var flow into the power network 90 at the point of substation 7 connection as shown in FIG. 1(b)

Level 1 Var flow control provides a great deal of security since many capacitor 9 locations are used and the failure of any one ACC 139 will effect only the switching of the single associated capacitor 9 and thus the voltage near to the capacitor location. A single failure will have a minimal effect on the overall level 1 controlled Var flow.

The ACC 139 makes use of a selection of adaptive functions of time and voltage to determine when to switch capacitors 9 ON as the voltage goes down as the load builds up, and when to switch capacitors OFF as the voltage goes up as the load goes down. Often this results with the capacitors being switched on in the morning and off at night. Many factors can contribute to more than one daily load peak, however, such as storms darkening the sky, power lines out of service for maintenance and large load variations. The ACC 139 accommodates these occurrences and switches as necessary, adapting to the desired number, N, of switch operations entered as a setpoint by the user of the control.

The ACC 139 switches ON and OFF about a long term average, V, of the voltage, v. By biasing this average voltage at the substation 7, a substation 7 LTC 162 affects the time of day when capacitors switch ON and the length of time they stay ON, thereby effecting the Var flows supplied to the power network 90 by the capacitors 9 located on distribution lines 5 supplied by the substations 7.

The accuracy of the voltage measurement by the LTC's 162 and ACC's 139 assures accurate coordination of the voltage out of the LTCT 100 and various ACC's 139 on a distribution system fed by said LTCT 100. With the inventive resolution of +/−0.1% in determining voltage magnitude obtainable according to the disclosure of the above referenced U.S. Pat. No. 5,315,527, the voltage itself becomes a means of communications between said LTCT 100 and various ACC's 139.

The inventive processes use steps that appear not to be derivable from known mathematical theorems.

Figure 4:
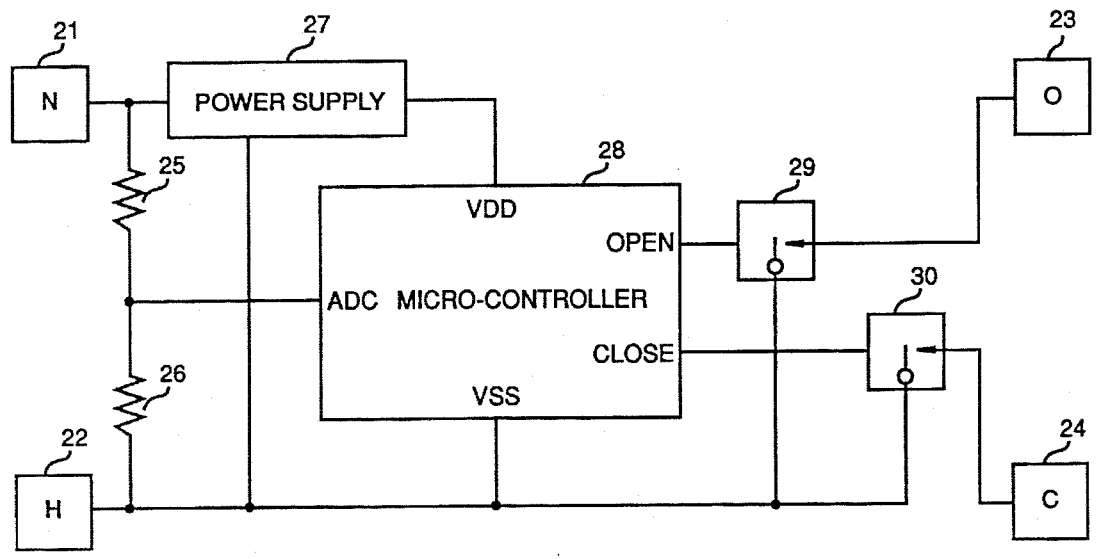
FIG. 4 is a circuit diagram for the ACC.

FIG. 4 shows the ACC 139 in more detail. Four terminals are shown with terminals (N) 21 and (H) 22 conveying the voltage to be measured and terminals (0) 23 and (C) 24 providing open and close outputs. The voltage between (N) 21 and (H) 22 is divided by resistors 25 and 26 so as to provide an appropriate analog to digital converter (ADC) input to microcontroller 28, preferably a Motorola HC11E9 having on board RAM, RAM and EEPROM. Voltage from terminals (N) 21 and (H) 22 further provide power for microcontroller 28 power via terminals VDD and VSS by power supply 27. Switch 29 is driven by microcontroller 28 output OPEN and when operated closes a circuit from terminal (0) 23 to terminal (H) 22. Switch 30 is driven by microcontroller 28 output CLOSE and when operated closes a circuit from terminal (C) 24 to terminal (H) 22. Terminals 21, 22, 23, and 24, may represent four blades of a meter like housing in one preferred embodiment of the ACC which resembles a household watthour meter. Switches 29 and 30 are closed momentarily to operate magnetic devices for opening and closing switches 120/122.

AN ELEMENTARY SYSTEM

In a second embodiment of the invention a generator directly provides the voltage control to a distribution system. FIG. 5 illustrates a very elementary power system wherein the generator control 45 directly raises or lowers the generator voltage to regulate capacitor switching. The field 44 of generator 41 is adjusted by control 45 thereby establishing voltage on generator bus 51. Control 45 senses generator voltage on bus 51 using transformer 42 and senses generator output current using transformer 43 and calculates the generator Var flow. Fixed ratio transformer 46 converts the generator output voltage to the distribution circuit 52 nominal voltage. Adaptive capacitor control 48 senses the voltage on distribution line 52 using transformer 48 and opens capacitor 49 switch 50. Capacitor 49 and switch 50 correspond to capacitors 9 and switches 120/122 using the inventive methods described above (see FIG. 2). Generator control 45 raises the generator voltage in order to induce capacitors 49 to be switched OFF and lowers said voltage to induce said capacitors to switch ON using the same general methods as described in more detail for control by LTCT's (see FIG. 2) as well as elsewhere herein, thereby directly controlling the generator Var flow to match a Var flow setpoint entered into control 45 by input 53.

The invention thereby provides system wide Var flow control, better customer voltage stability, and reduced power loss from Var flow for a small isolated power system.

KEEP TRACK

A method for a tapchanger control to keep track of the position of a tapswitch tap position has been described in U.S. Pat. No. 5,534,767 (U.S. patent application Ser. No. 08/152,001) cited above. This method will not work in general for LTC transformers due to the operation of motor starters such as RR and RL (see FIG. 2) by circuits which are not monitored by the tapchanger control. LTC transformer tapswitch drive motors such as M of FIG. 2 are commonly controlled by motor starters and these starters often have unused contacts. If such unused contacts are not available, replacement of such starters is not unduly expensive. These isolated and unused contacts are therefore used in the inventive apparatus and method for keeping track of the tapswitch position as indications that the tapchanger motor in running in the direction indicated by said contacts.

Control 162 senses contacts 111 and 112 with closure of contact 111 indicating motor M is moving in the direction to raise the tap position and closure of contact 112 indicating motor M is moving in the direction to lower the tap position. When counter contact 108 closes following closure of contacts 111 or 112, control 162 increases or decreases it record of tap position respectively by one tap position.

It is usual for LTCT's 100 at a particular location to have a rather consistent daily range of tap position. By installing tapswitch auxiliary contact 142 to close on a first tap position in this range, and inputting this tap position into control 162 as a calibration setpoint, control 162 then checks contact 142 and whenever closed, corrects the record of tapswitch position to the setpoint tap position. In this way the keep track procedure is self calibrating. If greater security of the keep track record, a second calibrating switch is added to tapswitch 104 and set for automatic recalibration at a second tap position.

This inventive method of keeping track of the tap position is used with LTC's 162 herein.

ADVANTAGES OF THIS INVENTION

1) Superior performance as compared to use of a central model, sampled telemetering and historical data. The inventive method measures the voltage at each capacitor location and therefore the actual conditions at each capacitor location, not the estimated conditions based on a theoretical model.

2) Determination of the Var flow transmitted into the transmission system by each distribution substation and management of this Var flow in accordance with a central SCADA Var flow control.

3) Var flow control using existing telemetry of Var flow to a central SCADA control location and sending Var flow requirements to inventive LTC controls at each distribution substation without the need for communications to the much larger number of capacitor locations.

4) Provision for good system Var flow control with failure of SCADA wherein each substation reverts to a zero bias setpoint and therefore still controls Var flow balance at each distribution substation.

5) Provision for good local Var flow control along distribution lines with failure of both the SCADA and LTC controls.

6) Elimination of need for setting capacitor controls for each specific installation location.

7) Elimination of need for communications to each capacitor control along distribution lines.

While the invention has been particularly shown and described with reference to a preferred embodiment thereof, it will be understood by those skilled in the art that various changes in form and details may be made therein without departing from the spirit and scope of the invention.

What is claimed is:

1. A method of controlling voltages in a power distribution network wherein requirements for communications are eliminated, said network including power lines for providing power at higher line voltages which are reduced to intermediate line voltages and then reduced to lower voltages for multiple user locations, the network including at the intermediate line voltages multiple capacitor means including means for switching said capacitor means ON or Off the network, said method comprising the steps of:

a) measuring voltages in relation to an average voltage at the capacitor means locations, b) establishing voltage changes about said average voltage, c) varying said capacitor means switching times non-linearly faster as voltage deviations away from said average voltage become larger, d) setting voltage limits at all capacitor means locations, e) changing the voltage reductions from said higher voltages to said intermediate voltages so as to maintain a desired voltage between said voltage limits, and f) making additional selective changes to said voltage reductions to effect capacitor means switching times whereby said capacitors means switch to provide voltages closer to the average voltage.

2. A method as in claim 1 further including the steps of:

a) averaging voltages over extended periods wherein said capacitor means are connected to, and disconnect from, said network a plurality of times, b) measuring voltage change when the capacitor means switch, c) adding said measured voltage change to the average voltage after a capacitor means is connected to the line, and d) subtracting said measured voltage from the average voltage after a capacitor means is disconnected from the line.

3. A method as in claim 1 wherein said voltages comprise AC voltages including the steps of:

a) digitizing only a half wave of said AC voltages to provide voltage signals, b) sampling voltage signals synchronously with an analog to digital converter in order to resolve voltage differences into a large number of increments.

4. A method as in claim 1 further including the steps of:

a) sensing voltage reductions resulting from increasing electrical loads nearby the capacitor means locations, and b) timing out and switching capacitor means onto the network at locations having the greatest voltage reduction.

5. A method as in claim 1 further including the steps of:

a) selectively placing capacitor means with switching control means on lines carrying said intermediate voltages, b) sensing voltage increases resulting from decreasing electrical loads nearby the capacitor means locations, and c) timing out and switching capacitor means Off of the network at locations having the greatest voltage increase.

6. A method as in claim 1 wherein said higher voltages are provided through transmission lines and said intermediate voltages are provided through distribution lines, and said method further including the further steps of:

a) using transformers with tapchanging switching means between said transmission lines and said distribution lines, b) providing adaptive capacitor control and switching means, c) sensing said voltage and current and measuring the Vars flowing between said transformer and said distribution lines, d) sensing a requirement for more Vars from said capacitor means and lowering said transformer output voltage thereby influencing said adaptive capacitor means controls to switch capacitor means ON at those capacitor means locations where the voltage is low, and e) sensing a requirement for less Vars from said capacitor means and raising said transformer output voltage thereby influencing said adaptive capacitor means controls to switch capacitor means Off at those capacitor means locations where the voltage is high thereby controlling the Vars flowing through the transformers and at the same time reducing the voltage Variations along said distribution lines.

7. A method as in claim 6 including the further steps of:

a) acquiring generator Var flows, b) acquiring power network Var flows, c) determining desired Var flows into said transmission lines from said generator, and d) sending desired Var flow setpoints to said transformer controls.

8. A method for controlling Var flow in an alternating current (AC) electric power system having transmission lines, distribution lines, and switchable power factor correction capacitor means, said capacitor means located at spaced locations along said distribution lines, said method comprising the steps of:

a) providing adaptive capacitor means controls to control capacitor means switches, b) sensing AC distribution line voltages at said respective capacitor means locations, c) setting an upper limit and a lower limit for said voltages, d) measuring said AC voltages, e) establishing lower voltages by measuring voltages just after said capacitor means are switched Off, f) establishing upper voltages by measuring voltages just after said capacitor means are switched On, g) designating an integrating timing function "H", h) with capacitor means switched Off, setting a non-linear range of values of, "▲H", starting with a low value, preferably 1 for voltages just below said lower voltage and ending with a higher value of "▲H" for voltages just above said lower limit, i) with capacitor means switched On, setting a non-linear range of values of "▲H" starting with a low value, preferably 1 for voltages just above said upper voltage and ending with a higher value of "▲H" for voltages just below said upper limit, j) summing "▲H" after each voltage measurement thereby forming sums "H", with "H" incrementing when voltages are measured within said non-linear regions k) establishing an initial value for "H'", the limit of H that results in a switch operation when exceeded, and l) switching capacitor means when H is greater than H'.

9. A method as in claim 8 further including the steps of:

a) counting the number of switch operations per day, and b) adjusting "H'" upward daily as required to decrease switch operations, and downward daily as required to increase operations so as to obtain a desired long term average number of switch operations per day.

10. A method as in claim 8 further including the steps of:

a) with capacitor means switched Off, setting a linear range of values ,"▲H" starting with a low value, preferably 1, of voltages just above said lower bandwidth voltage and ending with a higher value of "▲H" for voltages just below said upper limit, b) with capacitor means switched On, setting a linear range of values ,"▲H" starting with a low value , preferably 1, for voltages just below said upper bandwidth voltage and ending with a higher value of "▲H" for voltages just above said lower limit, c) summing "▲H" after each voltage measurement thereby forming sums "H" with "H" incrementing when voltages are measured within said non-linear regions and decrementing when voltages are measured within said linear regions but not decrementing below zero.

11. A method as in claim 10 further including the steps of:

a) adjusting "H'" upward daily as required to decrease switch operations, and downward daily as required to increase operations so as to obtain a desired long term average number of switch operations per day.

12. A method as in claim 8 further including the steps of:

a) dividing said non-linear ranges of values of "▲H" into a selected number of voltage increments, b) assigning positive integers to said values of "▲H" in ascending order from said bandedges to said voltage limits.

13. A method as in claim 8 further including the steps of:

a) numbering the increments starting with 1 at the bandedges and ending at the voltage limits, and b) making the "▲H" corresponding to each increment equal to the square of the number of the increments, where said non-linear distribution of values of ▲H follows a square law.

14. A method as in claim 13 further including the steps of:
a) measuring an AC voltage within a non-linear region,
b) assigning the measurement to the appropriate increment,
c) squaring the number of the increment thereby obtaining "▲H",
d) adding "▲H" to H and
e) comparing H to H' and if H' is greater initiating a capacitor means switching operation.

15. A method for controlling Vars in an alternating current (AC) electric power system having generators providing power to distribution lines by way of fixed ratio transformers, said system including controls for said generators, AC voltage, current and Var flow sensing means, and said system having switchable power factor correction capacitor means, said capacitor means located at spaced locations along said distribution lines, said method comprising the steps of:
a) providing adaptive capacitor means controls to control capacitor means switches,
b) sensing AC voltages at said respective capacitor means locations,
c) setting an upper and a lower limit for said voltages,
d) measuring said AC voltages,
e) establishing a lower measured voltage by measuring voltages when said capacitor means are switched Off,
f) establishing an upper measured voltage by measuring voltages when said capacitor means are switched On,
g) designating an integrating timing function "H",
h) with capacitor means switched Off, setting a non-linear range of values for "▲H" starting with a low value, preferably 1 for voltages just below said lower limit voltage and ending with a higher value of "▲H" for voltages just above said lower limit,
i) with capacitor means switched Off, setting a linear range of values for "▲H" starting with a low value, preferably 1 for voltages just above said lower limit voltage and ending with a higher value of "▲H" for voltages just below said upper limit,
j) with capacitor means switched On, setting a non-linear range of values of "▲H" starting with a low value, preferably 1 for voltages just above said upper bandwidth voltage and ending with a higher value of "▲H" for voltages just below said upper limit,
k) with capacitor means switched On, setting a linear range of values of "▲H" starting with a low value, preferably 1 for voltages just below said upper bandwidth voltage and ending with a higher value of "▲H" for voltages just above said lower limit,
l) summing "▲H" after each said voltage measurement thereby forming sums, "H", with "H" incrementing when voltages are measured within said non-linear regions and decrementing when voltages are measured within said linear regions but not decrementing below zero,
m) establishing an initial value for "H",
n) switching capacitor means when H is greater than ▲H'
o) counting the number of switch operations per day, and
p) adjusting "H'" upward daily as required to decrease switch operations and downward daily as required to increase operations so as to obtain a desired long term average number of switch operations per day,
q) developing generator Var flow information and coupling said information to said generator controls,
r) lowering the generator voltages and causing selected ones of said capacitor means to switch ON, and
s) raising the generator voltages and causing selected ones of said capacitor means to switch Off
thereby controlling the Vars required from the generator.

16. Apparatus for controlling Var flow in electric power systems including alternating current (AC) distribution lines, voltage control transformer means sending output power into said distribution lines, said apparatus comprising in combination:
a) means for determining a desired voltage to be sent into said distribution lines,
b) power factor correction equipment including a plurality of capacitor means located at spaced intervals along said distribution lines,
c) capacitor control means connecting said capacitor means after a time determined as a non-linear function of the amount the sensed voltage has been below average voltages sensed at said capacitor means locations,
d) said capacitor control means disconnecting said capacitor means after a time determined as a non-linear function of the amount the sensed voltage has been above average voltages sensed at said capacitor means locations,
e) means for sensing said transformer output voltages and currents and determining the Vars flowing between said transformers and said distribution lines,
f) said capacitor means control means including means for causing power to be sent temporarily at lower than said desired voltage to influence said capacitor means control means to connect said capacitor means so as to correct said Vars flowing to the desired Vars flowing, and
g) said capacitor means control means including means for causing power to be sent temporarily at higher than said desired voltage to influence said capacitor means control means to disconnect said capacitor means so as to correct said Vars flowing to the desired Vars flowing.

17. Apparatus for keeping track of the tap position of load tapchanging transformer means (LTCT) having primary and secondary windings, various tap positions on said secondary windings, said transformer including a load tapchanger control (LTC) device means for controlling said tap positions and having tap-switch means with a tapchange counter contact means, at least one auxiliary tapswitch contact means settable to indicate closure of a selected tap position, and tap-switch motor drive relay means, said motor drive relays having unused raise and lower contact means indicating the direction the motor is running when closed comprising, in combination:
a) said control device means connecting to said counter contact means, to said auxiliary contact means, to said unused raise contact means and to said unused lower contact means,
b) means for determining the end of LTCT tap position changes from said counter contact closures,
c) means of determining the direction of tap position changes from closures of said unused contacts,
d) means of setting said auxiliary contact means at a tap position selected as being frequently used in normal operation of the LTCT,
e) said LTC means making changes in tap position in its normal operation, and f) means of determining the tap position from sequences of said contact closures, g) correcting said determination as necessary whenever the tapswitch is on said selected tap position, and h) keeping a record of tap position, whereby said control keeps track of the tap position.

18. Apparatus as in claim 17 further comprising in combination:

a) means for determining the Vars flowing in and out of the secondary of said transformer, and b) means for using the tap position knowledge to determine the Vars flowing in and out of the primary of said transformer without requiring direct measurement of transformer primary voltages and currents.

19. Apparatus as in claim 17 wherein the change in direction of Vars flowing into said transformer primary is used as a criteria for controlling Var flow.

20. Apparatus for controlling losses on alternating current (AC) power distribution line by reduction of Var flow comprising, in combination:

a) a plurality of power factor correction capacitor means placed at spaced locations along AC power distribution lines with each capacitor means location being near to users of electric power, b) sensor means for sensing Var flow by detecting the voltage drop which said Var flow causes, and c) switching means for switching said capacitor means in response to a control with adaptive capacitor means switching times non-linearly faster as voltage deviations away from an average voltage become larger, and, on the average, connects each capacitor means no more than a selected number of times a day and for a time duration adaptively established by the voltage variations thereby limiting Var flows to short distances from inductive loads to capacitor means and thus reducing losses caused by Var flow.

21. A control device for switching alternating current (AC) distribution line power factor capacitor means, said capacitor means having capacitor means switching means operated by magnetic devices, and AC distribution line voltage stepdown transformer means comprising, in combination:

a) microcontroller means having analog to digital converter (ADC) means, b) means for obtaining AC signals for said (ADC) by sensing said stepdown transformer AC output voltage, c) means for obtaining power to operate said device from said stepdown transformer output voltage, d) first contact means for connecting said sensed voltage to said controls, e) second contact means for connecting a neutral return for said sensed voltage to said controls, f) third contact means for connecting control output contact means to operate magnetic devices for connecting said capacitor means to said distribution lines, g) fourth contact means for connecting control output contact means to operate magnetic devices for disconnecting said capacitor means from said distribution lines, h) microcontroller program means for continuously digitizing half waves of said AC signals by using said ADC, i) said program means sampling said half waves synchronously with said ADC, j) said program means determining a timing limit H using non-linear functions of voltage deviations from a desired voltage, k) said control means switching capacitor means when H is greater than H', l) said program means counting the number of switch operations per day, and m) said program means adjusting "H'" upward daily as required to decrease switch operations and downward daily as required to increase operations so as to obtain a desired long term average number of switch operations per day, 22. Apparatus as in claim 21 comprising in further combination, means for opening said third and fourth output contacts means after said magnetic device means have completed their operation.

23. Apparatus for controlling Var flow in electric power systems including alternating current (AC) distribution line power factor capacitor means equipment having capacitor means spaced at intervals along said distribution lines, switching means for said capacitor means, AC distribution line voltage sensing means, and voltage control transformers means for sending voltages into said distribution lines comprising, in combination:

a) control means for switching said capacitor means, b) first contact means for connecting said sensed voltage to said controls, c) second contact means for connecting a reference for said sensed voltage to said controls, d) third contact means for connecting control output contact means to operate magnetic devices for connecting said capacitor means to said distribution lines, e) fourth contact means for connecting control output contact means to operate magnetic devices for disconnecting said capacitor means from said distribution lines, f) voltage control transformers sending a constant voltage into said distribution lines, g) means whereby said controls receive said voltages sent by said transformers but modified by effects of distribution line impedance and user loads along said distribution lines by determining the average voltages at the capacitor means locations, h) means whereby said controls adapt to connecting and disconnecting said capacitor means no more than a selected number of times per day in response to sensing voltages below and above said average voltages, i) means whereby said transformers send a lower voltage in order to influence capacitor means to be connected and to send a higher voltage in order to influence capacitor means to be disconnected, j) means for rapidly responding to said further lowered voltages at capacitor means locations where the voltage is lowest and not already connected and connecting those capacitor means, and k) means for rapidly responding to said further raised voltages at capacitor means locations where the voltage is highest and not already disconnected and disconnecting those capacitor means.

* * * * *